(12) United States Patent
Nakajima

(10) Patent No.: US 11,238,621 B2
(45) Date of Patent: Feb. 1, 2022

(54) VEHICLE DISPLAY DEVICE

(71) Applicant: Yazaki Corporation, Tokyo (JP)

(72) Inventor: Harutoshi Nakajima, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/537,479

(22) Filed: Aug. 9, 2019

(65) Prior Publication Data

US 2020/0082575 A1   Mar. 12, 2020

(30) Foreign Application Priority Data

Sep. 12, 2018 (JP) .............................. JP2018-170450

(51) Int. Cl.
*G06T 11/00* (2006.01)
*B60R 1/00* (2006.01)
(Continued)

(52) U.S. Cl.
CPC ................ *G06T 11/00* (2013.01); *B60R 1/00* (2013.01); *G06T 3/60* (2013.01); *G06T 15/00* (2013.01); *G09G 5/38* (2013.01); *B60K 35/00* (2013.01); *B60K 2370/167* (2019.05); *B60K 2370/52* (2019.05); *B60R 2300/304* (2013.01); *B60R 2300/307* (2013.01); *G09G 2340/0492* (2013.01); *G09G 2380/10* (2013.01)

(58) Field of Classification Search
None
See application file for complete search history.

(56) References Cited

U.S. PATENT DOCUMENTS 5,877,769 A  * 3/1999 Shinohara ............... G06T 15/80
                                                         345/419
2011/0273528 A1 * 11/2011 Sazawa ................... G06T 15/20
                                                          348/36
(Continued)

FOREIGN PATENT DOCUMENTS

JP        2009-149306 A     7/2009
JP        2015-20498 A      2/2015
(Continued)

OTHER PUBLICATIONS

Author: Ho et al.; Title: Automatic Mosaicking of 360° Panorama in Video Surveillance; Date: Dec. 2008; Source: https://apps.dtic.mil/dtic/tr/fulltext/u2/a492059.pdf (Year: 2008).*

(Continued)

*Primary Examiner* — Jwalant Amin

(74) *Attorney, Agent, or Firm* — Kenealy Vaidya LLP

(57) ABSTRACT

A vehicle display device includes: a display unit that is disposed in a host vehicle and that displays an image; an imaging unit that captures an image of circumstances surrounding the host vehicle; and a controller configured to perform processing through which, by controlling the display unit, a virtual vehicle image representing a virtual vehicle imitating the host vehicle is displayed, and the image of the circumstances surrounding the host vehicle captured (Continued)

by the imaging unit is pasted for display as a reflected image representing reflection in the host vehicle onto an outer panel of the virtual vehicle represented by the virtual vehicle image.

10 Claims, 4 Drawing Sheets

(51) Int. Cl.
*G09G 5/38* (2006.01)
*G06T 3/60* (2006.01)
*G06T 15/00* (2011.01)
*B60K 35/00* (2006.01)

(56) References Cited

U.S. PATENT DOCUMENTS

| | | |
|---|---|---|
| 2014/0085466 A1 | 3/2014 | Moriyama et al. |
| 2014/0333729 A1* | 11/2014 | Pflug ................. G06T 15/20 348/47 |
| 2016/0379411 A1* | 12/2016 | Harbach ............ G06K 9/00791 345/633 |
| 2017/0305365 A1 | 10/2017 | Matsumoto |
| 2019/0135197 A1 | 5/2019 | Kanaya |
| 2019/0244324 A1 | 8/2019 | Watanabe et al. |

FOREIGN PATENT DOCUMENTS

| | | |
|---|---|---|
| JP | 2016-91058 A | 5/2016 |
| WO | 2016/210257 A1 | 12/2016 |
| WO | 2018/042976 A1 | 3/2018 |
| WO | 2018/070298 A1 | 4/2018 |

OTHER PUBLICATIONS

Author: Mettle; Title: Generate a Reflection Map From Your 3D Scene in After Effects with SkyBox; Date: Jun. 2012; Source: https://www.mettle.com/make-your-maserati-look-amazing-in-after-effects/ (Year: 2012).*

Author: Meyer et al.; Title: RealTime Reflection on Moving Vehicles in Urban Environments; Date: Oct. 2003; Source: https://dl.acm.org/doi/10.1145/1008653.1008662 (Year: 2003).*

Author: Steinicke et al.; Title: Virtual Reflections and Virtual Shadows in Mixed Reality Environments; p. 4; Date: 2005; Source: https://link.springer.com/content/pdf/10.1007%2F11555261_94.pdf (Year: 2005).*

* cited by examiner

VEHICLE DISPLAY DEVICE

CROSS-REFERENCE TO RELATED APPLICATION(S)

The present application claims priority to and incorporates by reference the entire contents of Japanese Patent Application No. 2018-170450 filed in Japan on Sep. 12, 2018.

BACKGROUND OF THE INVENTION

1. Field of the Invention

The present invention relates to a vehicle display device.

2. Description of the Related Art

Japanese Patent Application Laid-open No. 2009-149306, for example, discloses a vehicle display device that includes a display unit, an imaging unit, and a display controller. The display controller causes the display unit to display a marker image including a rearview mirror image relating to a host vehicle and to display, at a position corresponding to an imaging direction with reference to the marker image, a rearward image captured by the imaging unit.

A further improvement can be made on the vehicle display device disclosed in Japanese Patent Application Laid-open No. 2009-149306. An example of the further improvement is display that is more readily understandable.

SUMMARY OF THE INVENTION

The present invention has been made in view of the foregoing circumstances and it is an object of the present invention to provide a vehicle display device that can appropriately display circumstances surrounding a host vehicle.

In order to achieve the above mentioned object, a vehicle display device according to one aspect of the present invention includes a display unit disposed in a host vehicle and displaying an image; an imaging unit that captures an image of circumstances surrounding the host vehicle; and a controller configured to perform processing through which, by controlling the display unit, a virtual vehicle image representing a virtual vehicle imitating the host vehicle is displayed, and the image of the circumstances surrounding the host vehicle captured by the imaging unit is pasted for display as a reflected image representing reflection in the host vehicle onto an outer panel of the virtual vehicle represented by the virtual vehicle image.

According to another aspect of the present invention, in the vehicle display device, it is possible to configure that the controller controls the display unit to vary an orientation of the virtual vehicle represented by the virtual vehicle image according to changes in the image of the circumstances surrounding the host vehicle captured by the imaging unit.

According to still another aspect of the present invention, in the vehicle display device, it is possible to configure that the controller controls the display unit to emphasize a specific object image representing a specific object included in the reflected image.

According to still another aspect of the present invention, in the vehicle display device, it is possible to further include that a host vehicle status detecting device that detects a status of the host vehicle, wherein the controller varies the orientation of the virtual vehicle represented by the virtual vehicle image according to the status of the host vehicle detected by the host vehicle status detecting device.

In order to achieve the above mentioned object, a vehicle display device according to still another aspect of the present invention includes a display unit disposed in a host vehicle and displaying an image; an acquisition unit that acquires an image of circumstances surrounding the host vehicle, the image being captured by an imaging unit; and a controller configured to perform processing through which, by controlling the display unit, a virtual vehicle image representing a virtual vehicle imitating the host vehicle is displayed, and the image of the circumstances surrounding the host vehicle acquired by the acquisition unit is pasted for display as a reflected image representing reflection in the host vehicle onto an outer panel of the virtual vehicle represented by the virtual vehicle image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following details, with reference to the accompanying drawings, an embodiment of the present invention. The embodiment is illustrative only and should not be considered limiting. The elements described hereunder include those that can be easily conceived by those skilled in the art or those that are substantially identical to each other.

Embodiment

Figure 1:
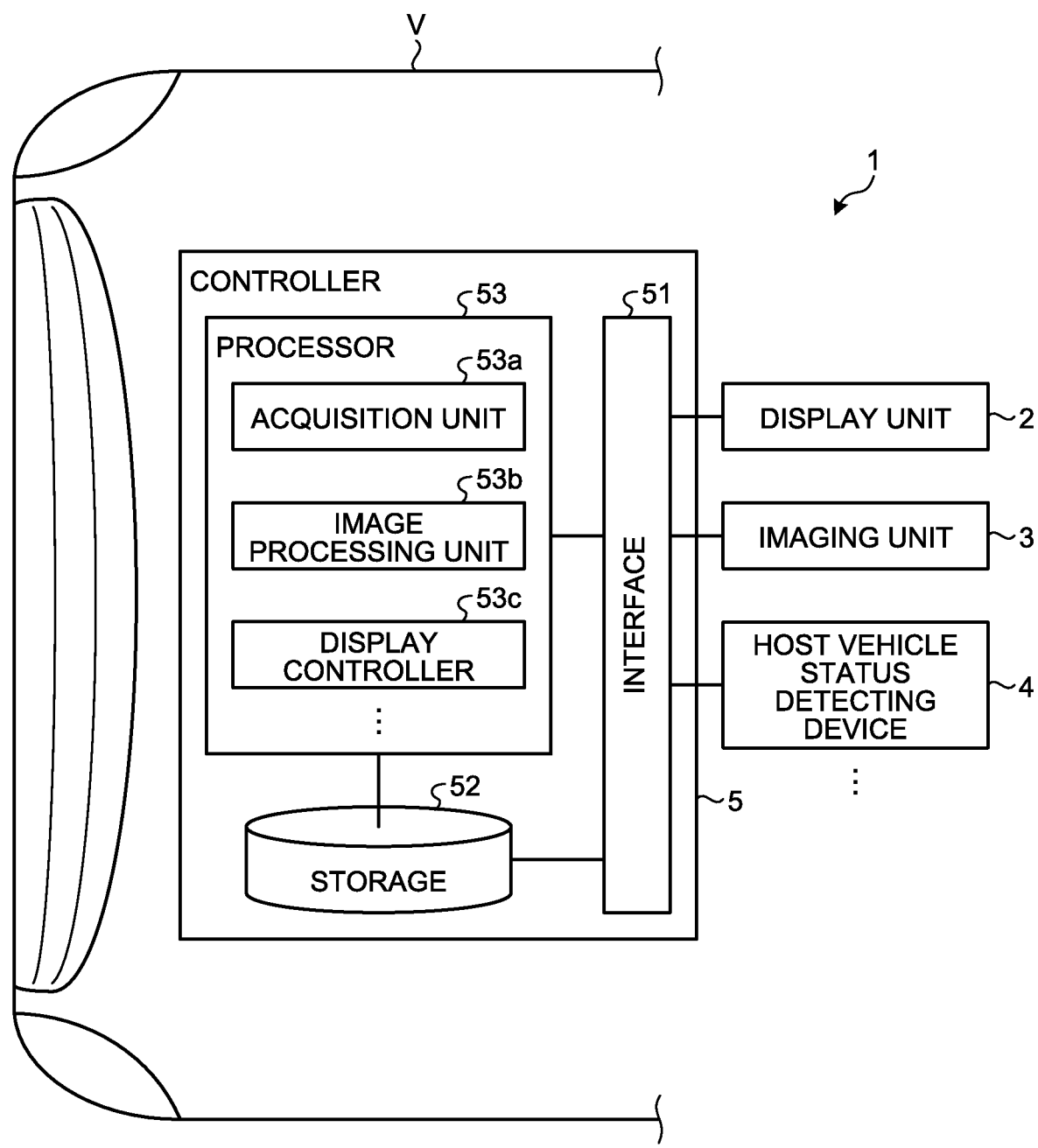
FIG. 1 is a block diagram of a schematic configuration of a vehicle display device according to an embodiment.
Figure 2:
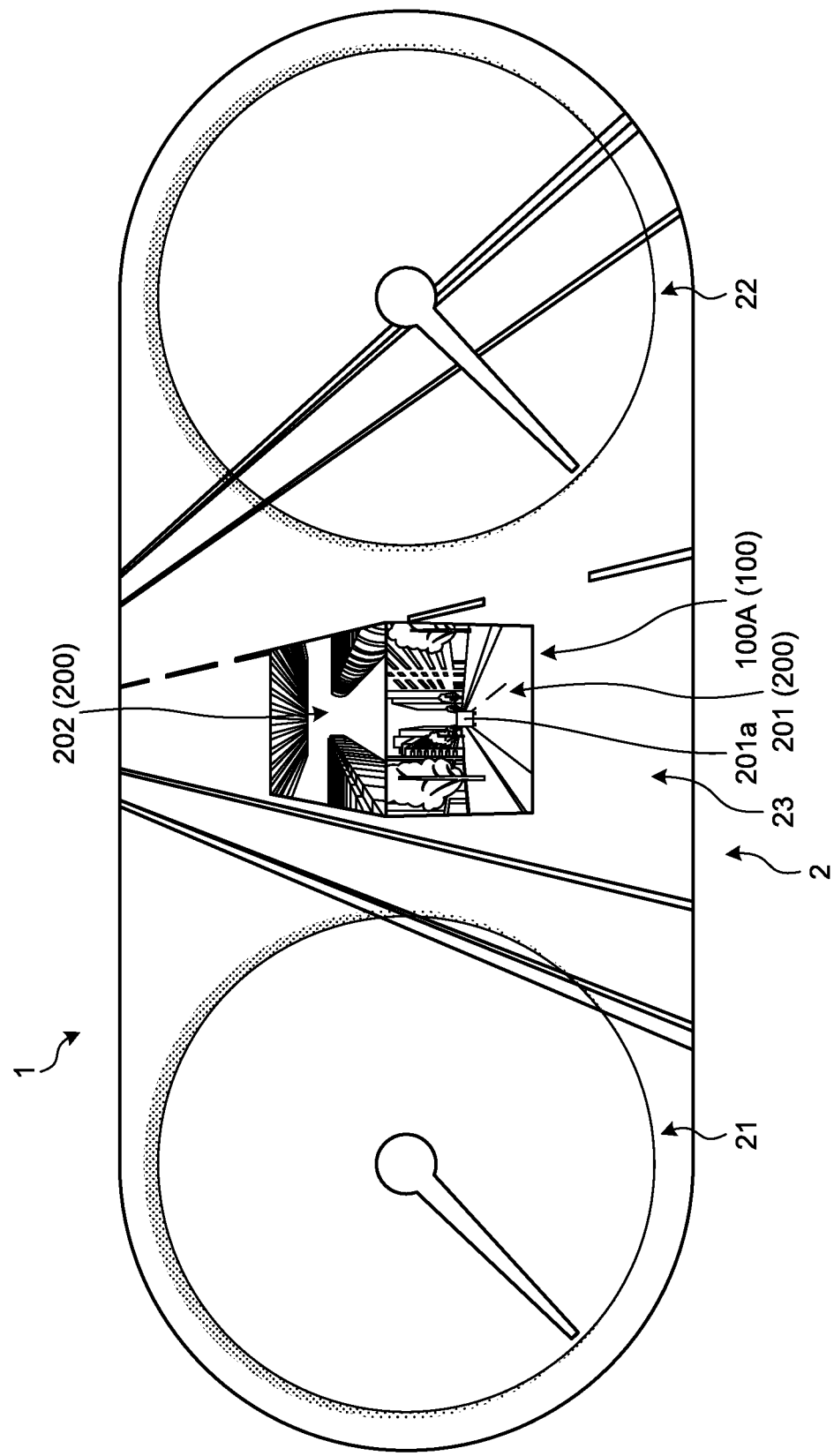
FIG. 2 is a front elevation view schematically illustrating a display unit of the vehicle display device according to the embodiment.

A vehicle display device 1 according to the embodiment illustrated in FIGS. 1 and 2 is mounted on a host vehicle V and displays various types of information on the host vehicle V. Specifically, the host vehicle V is a vehicle on which the vehicle display device 1 in the embodiment is mounted. The vehicle display device 1 in the embodiment pastes a reflected image 200, which can vary depending on circumstances surrounding the host vehicle V, onto a virtual vehicle image 100 to display, in an intuitive and easy to understand manner, the circumstances surrounding the host vehicle V. The following details, with reference to the accompanying drawings, each of various configurations of the vehicle display device 1.

Specifically, the vehicle display device 1 includes a display unit 2, an imaging unit 3, a host vehicle status detecting device 4, and a controller 5.

The display unit 2 is mounted on the host vehicle V and displays an image. Examples of the display unit 2 include, but are not limited to, a thin liquid crystal display, a plasma display, and an organic electro luminescence (EL) display. The display unit 2 in the embodiment constitutes what is called an in-vehicle meter. The display unit 2 is mounted, for example, on an instrument panel disposed in a dashboard of the host vehicle V and displays various types of information on the host vehicle V as information provided for driving of the host vehicle V. The display unit 2 displays, for example, meter images 21 and 22 (illustrated only schematically in FIG. 2). The meter images 21 and 22 represent images of various types of meters, such as a speedometer and a tachometer that indicate, as information on the host vehicle V, a vehicle speed of the host vehicle V and an output speed of a drive power source, respectively, through a pointer or a scale. The display unit 2 in the embodiment has a driving support display area 23. The driving support display area 23 is disposed between the meter image 21 and the meter image 22. The driving support display area 23 displays various images for supporting driving in the host vehicle V. The display unit 2 in the embodiment displays, for example, the virtual vehicle image 100 and the reflected image 200 in the driving support display area 23.

The vehicle display device 1 may include, instead of the meter images 21 and 22 displayed in the display unit 2, analog meters constituting, for example, the speedometer and the tachometer. The display unit 2 may constitute, for example, a center display mounted in a center console, instead of the in-vehicle meter. Alternatively, a navigation system display device may serve as the display unit 2. The display unit 2 may even be, for example, what is called a head-up display.

The imaging unit 3 captures an image of circumstances surrounding the host vehicle V. The imaging unit 3 is configured, for example, as an imaging device such as a CCD camera that continuously captures images of the circumstances surrounding the host vehicle V. The imaging unit 3 typically captures images of the omnidirectional circumstances surrounding the host vehicle V excepting a lower surface side in a vertical direction of the host vehicle V. The imaging unit 3 may incorporate a single wide-angle imaging device or a plurality of imaging devices to cover the omnidirectional imaging range excepting the lower surface side in the vertical direction of the host vehicle V.

The host vehicle status detecting device 4 detects a status of the host vehicle V. The host vehicle status detecting device 4 includes various types of sensors and detectors that detect statuses of the host vehicle V. The host vehicle status detecting device 4 detects various types of information as host vehicle status information representing the statuses of the host vehicle V. Examples of the host vehicle status information include, but are not limited to: vehicle speed information, acceleration (such as acceleration in a vehicle front-back direction, acceleration in a vehicle width direction, and acceleration in a vehicle roll direction) information, steering angle information, accelerator pedal operation amount (accelerator pedal depression amount) information, brake pedal operation amount (brake pedal depression amount) information, shift position information, current/voltage value information at difference parts of the vehicle, electricity storage amount information of an electricity storage device, current position information (GPS information) of the host vehicle V. The host vehicle status detecting device 4 includes various types of sensors and detectors including, for example, a vehicle speed sensor, an acceleration sensor, a steering angle sensor, an accelerator pedal sensor, a brake pedal sensor, a shift position sensor, an ammeter/voltmeter, and a GPS receiver. The host vehicle status detecting device 4 may include a processor such as an electronic control unit (ECU) that controls various parts in the host vehicle V.

The controller 5 integrally controls different parts of the vehicle display device 1. The controller 5 performs various types of processing for achieving display given by the display unit 2. The ECU that controls the different parts of the host vehicle V may function as the controller 5. The controller 5 includes an electronic circuit that serves mainly as a well-known microcomputer including a central processing unit (CPU), a ROM, a RAM, and an interface. The controller 5 is connected with different parts of the vehicle display device 1 including the display unit 2, the imaging unit 3, and the host vehicle status detecting device 4 so as to be capable of communicating with the different parts of the vehicle display device 1. The controller 5 thus can transmit and receive various types of signals to and from each of the different parts of the vehicle display device 1.

Specifically, the controller 5 includes, in terms of a functional concept, an interface 51, a storage 52, and a processor 53. The interface 51, the storage 52, and the processor 53 each can transmit and receive various types of information to and from each of the different types of devices connected electrically.

The interface 51 serves as an interface for transmitting and receiving various types of information to and from each of the different parts of the vehicle display device 1 including the display unit 2, the imaging unit 3, and the host vehicle status detecting device 4. The interface 51 has, for example, a function of performing wired communication with each of the different parts of the vehicle display device 1 via, for example, an electric wire and a function of performing wireless communication with each of the different parts of the vehicle display device 1 via, for example, a wireless communication unit.

The storage 52 is, for example, a ROM, a RAM, and a semiconductor memory. The storage 52 stores, for example, conditions or information required for various types of processing performed by the vehicle display device 1 and various programs, applications, and control data to be performed by the processor 53. The storage 52 stores various types of image information to be displayed by the display unit 2 (e.g., image information relating to, for example, the virtual vehicle image 100 to be described later). The storage 52 also stores three-dimensional map information, for example. The storage 52 can also temporarily store various types of detection information detected by the host vehicle status detecting device 4 and various types of information acquired by the processor 53. The processor 53 loads the foregoing types of information from the storage 52 as required.

The processor 53 assumes an arithmetic operation part that performs various programs stored in the storage 52 and performs various types of processing for achieving various functions that can be performed by operation of the different parts of the vehicle display device 1 through running of the programs. The processor 53 includes, in terms of a functional concept, an acquisition unit 53*a*, an image processing unit 53*b*, and a display controller 53*c*.

The acquisition unit 53*a* has a function of performing processing for acquiring various types of information used for various types of processing performed by the vehicle display device 1. The acquisition unit 53*a* acquires, for example, image information of an image of the circumstances surrounding the host vehicle V captured by the imaging unit 3 and detection information detected by the host vehicle status detecting device 4. The acquisition unit 53*a* can store the various types of information acquired thereby in the storage 52.

The image processing unit 53*b* has a function of performing various types of image processing on images to be displayed by the display unit 2. The image processing unit 53*b* generates the images to be displayed by the display unit 2 on the basis of, for example, the various types of image information stored in the storage 52, the image information of the image of the circumstances surrounding the host vehicle V captured by the imaging unit 3 and acquired by the acquisition unit 53*a*, and the detection information detected by the host vehicle status detecting device 4 and acquired by the acquisition unit 53*a*.

The display controller 53*c* has a function of controlling the display unit 2 and enabling processing for displaying the image to be performed. The display controller 53*c* typically controls the display unit 2 and causes the display unit 2 to display an image generated by the image processing unit 53*b* through image processing.

Figure 3:
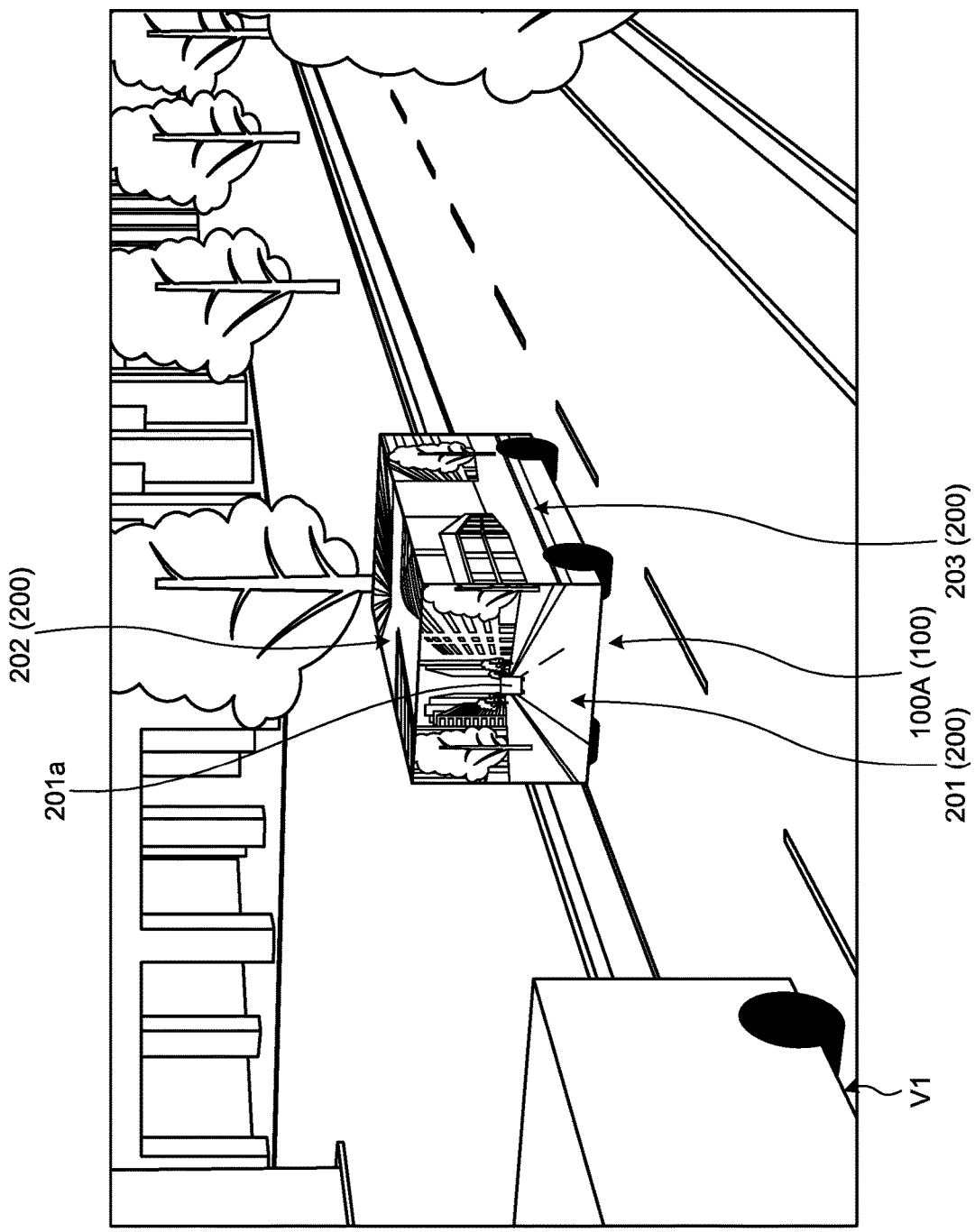
FIG. 3 is a schematic view of an example of a display image in the vehicle display device according to the embodiment.

As illustrated in FIGS. 2 and 3, the processor 53 in the embodiment can perform processing for combining and displaying the virtual vehicle image 100 and the reflected image 200 by controlling the display unit 2 through the image processing unit 53*b* and the display controller 53*c*.

The virtual vehicle image 100 to be displayed in the display unit 2 is an image that represents a virtual vehicle 100A, which imitates the host vehicle V. The virtual vehicle 100A may directly represent an outline shape of the host vehicle V or simplify the outline shape of the host vehicle V as appropriate. The reflected image 200 is an image that virtually imitates reflection in the host vehicle V on the basis of an image of the circumstances surrounding the host vehicle V captured by the imaging unit 3 and acquired by the acquisition unit 53*a*.

The image processing unit 53*b* in the embodiment reads the virtual vehicle image 100 in the storage 52 and generates a display image that represents the image of the circumstances surrounding the host vehicle V captured by the imaging unit 3 and acquired by the acquisition unit 53*a*, pasted as the reflected image 200 onto an outer panel (body) of the virtual vehicle 100A, which the virtual vehicle image 100 represents. In this case, the image processing unit 53*b* subjects the image of the circumstances surrounding the host vehicle V and the virtual vehicle image 100 to various types of well-known digital processing and mapping (texture mapping). Through the foregoing types of processing, the image processing unit 53*b* pastes, as the reflected image 200, the image of the circumstances surrounding the host vehicle V onto the outer panel of the virtual vehicle 100A, which the virtual vehicle image 100 represents, thereby generating the display image.

For example, the image processing unit 53*b* pastes an image posterior to the host vehicle V out of the image of the circumstances surrounding the host vehicle V, as a posterior reflected image 201, onto the outer panel of a rear portion of the virtual vehicle 100A. In the examples illustrated in FIGS. 2 and 3, the posterior reflected image 201 is an image having reflected therein, for example, an another vehicle image 201*a*, which represents another vehicle V1 running to follow the host vehicle V, a posterior road surface, and a posterior background. Similarly, the image processing unit 53*b* pastes an image superior to the host vehicle V out of the image of the circumstances surrounding the host vehicle V, as a superior reflected image 202, onto the outer panel of an upper portion of the virtual vehicle 100A. The image processing unit 53*b* pastes an image of a right lateral side of the host vehicle V out of the image of the circumstances surrounding the host vehicle V, as a right lateral reflected image 203, onto the outer panel of a right side portion of the virtual vehicle 100A. Although not illustrated, the image processing unit 53*b* also pastes images anterior to, and of a left lateral side of, the host vehicle V, specifically, an image anterior to the host vehicle V and an image of the left lateral side of the host vehicle V out of the image of the circumstances surrounding the host vehicle V, as an anterior reflected image and a left lateral reflected image, onto the outer panel of a front portion and a left side portion, respectively, of the virtual vehicle 100A.

The display controller 53*c* controls the display unit 2 on the basis of the display image generated by the image processing unit 53*b* and performs processing for displaying the display image in the driving support display area 23 of the display unit 2. Specifically, the display controller 53*c* displays on the display unit 2 the display image that represents the image of the circumstances surrounding the host vehicle V captured by the imaging unit 3 and acquired by the acquisition unit 53*a*, the image of the circumstances being pasted as the reflected image 200 onto the outer panel of the virtual vehicle 100A.

In this case, the display controller 53*c* may display, in the display unit 2, the virtual vehicle image 100 and the reflected image 200 in a virtual space, together with a road surface image or a background image that may vary depending on the current position of the host vehicle V. For example, the image processing unit 53*b* reads from the storage 52 three-dimensional map information to correspond with the current position information of the host vehicle V detected by the host vehicle status detecting device 4 and acquired by the acquisition unit 53*a* and generates the road surface image or the background image to be displayed on the display unit 2. FIG. 2 illustrates an example of the virtual vehicle image 100 and the reflected image 200 displayed on the road surface image that corresponds with the current position of the host vehicle V. FIG. 3 illustrates an example of the virtual vehicle image 100 and the reflected image 200 displayed on the road surface image and the background image that correspond with the current position of the host vehicle V.

Figure 4:
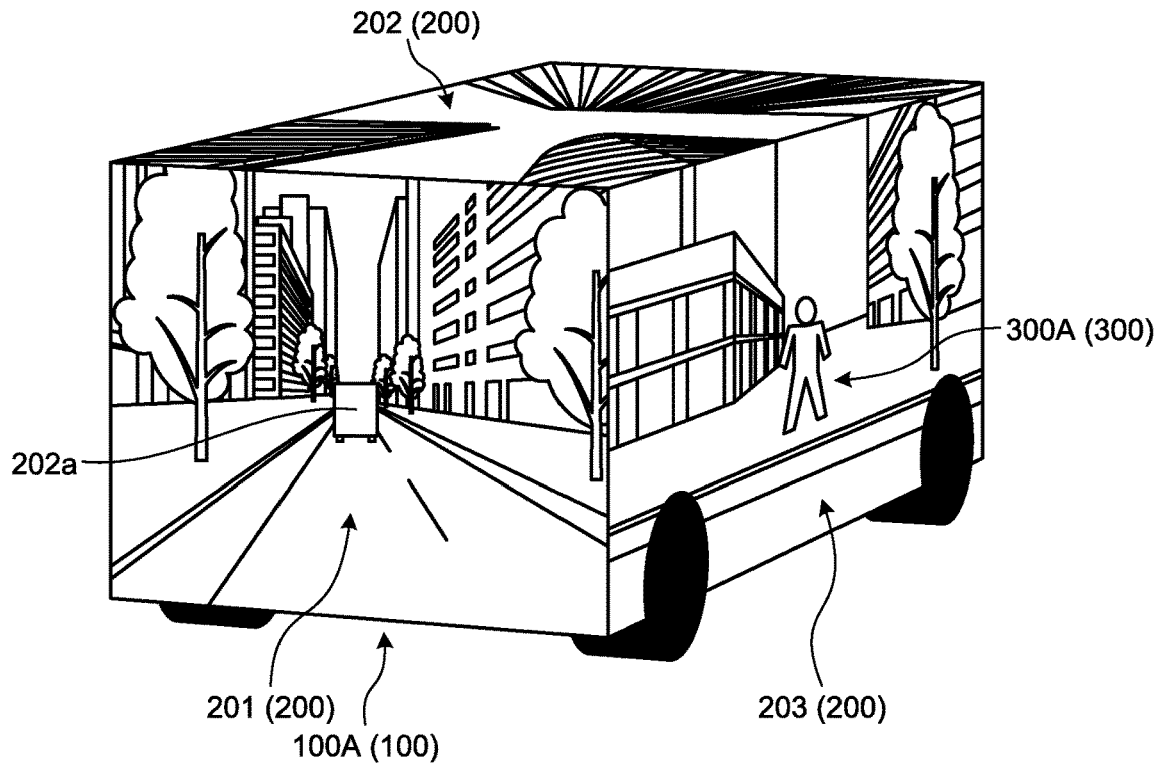
FIG. 4 is a schematic view of an example of the display image in the vehicle display device according to the embodiment.

The processor 53 in the embodiment can vary an orientation of the virtual vehicle 100A, which the virtual vehicle image 100 represents, by controlling the display unit 2 through the image processing unit 53*b* and the display controller 53*c*, in response to changes in the image of the circumstances surrounding the host vehicle V, as illustrated in FIG. 4. Additionally, the processor 53 in the embodiment can emphasize a specific object image 300, which represents a specific object 300A included in the reflected image 200, by controlling the display unit 2 through the image processing unit 53*b* and the display controller 53*c* as illustrated in FIG. 4.

In the example illustrated in FIG. 4, the right lateral reflected image 203, which constitutes the reflected image 200, includes as the specific object 300A the specific object image 300, which represents a person on the right side of the host vehicle V. The image processing unit 53*b* performs various types of well-known personal recognition processing for the image of the circumstances surrounding the host vehicle V captured by the imaging unit 3 and, when a person is detected in the image, generates a display image that emphasizes the specific object image 300, in which the person is identified as the specific object 300A. The image processing unit 53b may, for example, increase contrast of the specific object image 300 in the reflected image 200 relative to other areas to emphasize the specific object image 300. Alternatively, the image processing unit 53b may encircle the specific object image 300 to emphasize the specific object image 300.

When, for example, the image of the circumstances surrounding the host vehicle V changes from a condition in which the specific object image 300 is not included in the reflected image 200 to a condition in which the specific object image 300 is included in the reflected image 200, the image processing unit 53b changes the orientation of the virtual vehicle 100A, which the virtual vehicle image 100 represents. In this case, the image processing unit 53b generates, for example, a display image in which the virtual vehicle 100A is rotated such that the reflected image 200 including the specific object image 300 is oriented toward a front side (the side on which a driver or the like can visually recognize). In the example illustrated in FIG. 4, the image processing unit 53b generates a display image in which, for example, the virtual vehicle 100A is rotated clockwise such that the right lateral reflected image 203 faces the front side, thereby allows the right lateral reflected image 203 including the specific object image 300 to be easily visible.

The display controller 53c displays the virtual vehicle image 100 and the reflected image 200 on the display unit 2 on the basis of the display image generated by the image processing unit 53b. Specifically, the display controller 53c displays in the display unit 2 the virtual vehicle image 100 and the reflected image 200, in which the specific object image 300, which represents the specific object (person) 300A, is emphasized and in which the virtual vehicle 100A is rotated such that the reflected image 200 (right lateral reflected image 203) including the specific object image 300 is easily visible.

The processor 53 may control the display unit 2 through the image processing unit 53b and the display controller 53c to vary the orientation of the virtual vehicle 100A, which the virtual vehicle image 100 represents, according to the host vehicle status information that represents the status of the host vehicle V and that is detected by the host vehicle status detecting device 4 and acquired by the acquisition unit 53a. In this case, the image processing unit 53b generates the display image, in which the virtual vehicle 100A is rotated according to, for example, the steering angle information included in the host vehicle status information. The display controller 53c then displays on the display unit 2 the virtual vehicle image 100, which represents the virtual vehicle 100A rotated to correspond with the steering angle of the host vehicle V, and the reflected image 200, on the basis of the display image generated by the image processing unit 53b.

The processor 53 displays the image of the circumstances surrounding the host vehicle V, captured by the imaging unit 3, together with the virtual vehicle image 100, as the reflected image 200 on the display unit 2 on a real-time basis. The image processing unit 53b generates, at predetermined control cycles, sequential display images to correspond with the image of the circumstances surrounding the host vehicle V, which varies every moment as the host vehicle V runs. The display controller 53c displays on the display unit 2 the display images that are sequentially generated by the image processing unit 53b on a real-time basis. The phrasing of "on a real-time basis", as used herein, allows for a certain time lag required for, for example, processing the images.

Figure 5:
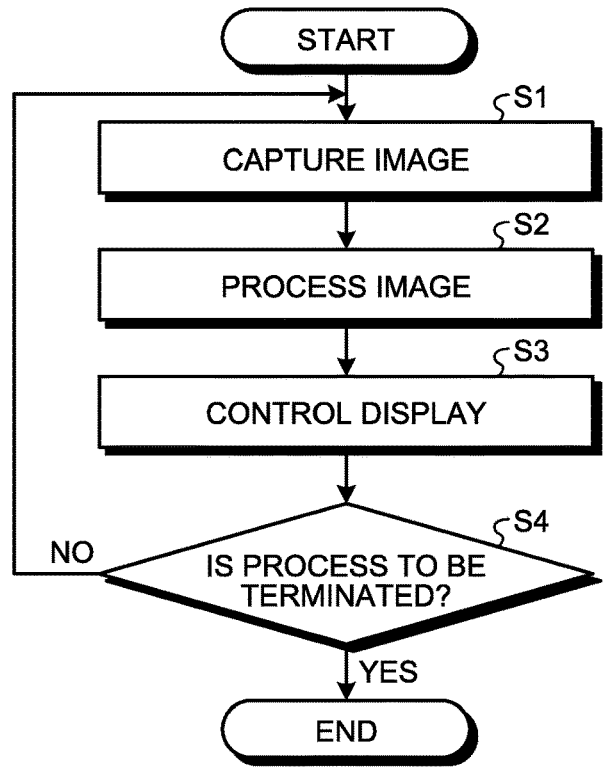
FIG. 5 is a flowchart that illustrates an example of processing performed by the vehicle display device according to the embodiment.

The following describes, with reference to the flowchart of FIG. 5, an example of display processing performed by the vehicle display device 1.

When, for example, an ignition of the host vehicle V is turned ON, the imaging unit 3 starts capturing images of the circumstances surrounding the host vehicle V and the acquisition unit 53a acquires information on the images of the circumstances surrounding the host vehicle V captured by the imaging unit 3 (Step S1).

The image processing unit 53b performs image processing on the basis of the information on the images of the circumstances surrounding the host vehicle V acquired at Step S1 and generates a display image, in which the image of the circumstances surrounding the host vehicle V is pasted as the reflected image 200 on the outer panel of the virtual vehicle 100A (Step S2).

The display controller 53c controls the display unit 2 on the basis of the display image generated at Step S2 and displays on the display unit 2 the display image, in which the image of the circumstances surrounding the host vehicle V is pasted as the reflected image 200 on the outer panel of the virtual vehicle 100A (Step S3).

The display controller 53c determines whether the display by the display unit 2 is to be terminated (Step S4). The display controller 53c determines that the display by the display unit 2 is to be terminated when, for example, the ignition of the host vehicle V is turned OFF or an operation is performed to turn OFF the display by the display unit 2.

The display controller 53c, when not determining that the display by the display unit 2 is to be terminated (No at Step S4), returns to Step S1, and thereby causes subsequent steps to be repeated. The display controller 53c, when determining that the display by the display unit 2 is to be terminated (Yes at Step S4), terminates the display processing.

The vehicle display device 1 described above can perform processing through which, by causing the controller 5 to control the display unit 2, the image of the circumstances surrounding the host vehicle V captured by the imaging unit 3 is pasted for display as the reflected image 200, which represents reflection in the host vehicle V, onto the outer panel of the virtual vehicle 100A, which the virtual vehicle image 100 represents. Through the foregoing processing, the vehicle display device 1 can reflect in the outer panel of the virtual vehicle 100A, which the virtual vehicle image 100 represents, and display as the reflected image 200, for example, an actual scene, a building, another vehicle, a person, and an obstacle in the circumstances surrounding the host vehicle V. As a result, the vehicle display device 1 can display, on the display unit 2, in an intuitive and easy to understand manner, the circumstances surrounding the host vehicle V through an imitation of a natural phenomenon, so that the vehicle display device 1 can appropriately display the circumstances surrounding the host vehicle V. Thus, the vehicle display device 1 can, for example, allow the driver or the like of the host vehicle V to naturally and readily recognize what are going on in the circumstances surrounding the host vehicle V and enables the driver or the like to easily select information required for driving. The vehicle display device 1 can display, as the reflected image 200 in the outer panel of the virtual vehicle 100A, the image of the circumstances surrounding the host vehicle V, which varies every moment as the host vehicle V runs, on a real-time basis. As a result, the vehicle display device 1 can display the circumstances surrounding the host vehicle V, which varies every moment in a readily understandable manner.

The vehicle display device 1 described above can also vary in the display unit 2 the orientation of the virtual vehicle 100A, which the virtual vehicle image 100 represents, to correspond with changes in the image of the circumstances surrounding the host vehicle V captured by the imaging unit 3. In this case, the vehicle display device 1 varies the orientation of the virtual vehicle 100A to correspond with the changes in the image of the circumstances surrounding the host vehicle V, thereby allowing changes in the circumstances surrounding the host vehicle V to be easily recognized.

The vehicle display device 1 described above can also emphasize in the display unit 2 the specific object image 300 included in the reflected image 200. In this case, the vehicle display device 1 can allow a specific object 300A (e.g., a person) in the circumstances surrounding the host vehicle V to be more readily recognized.

The vehicle display device 1 described above can also vary the orientation of the virtual vehicle 100A, which the virtual vehicle image 100 represents, according to the status of the host vehicle V detected by the host vehicle status detecting device 4. In this case, the vehicle display device 1 can display the status of the host vehicle V with the orientation of the virtual vehicle 100A, which the virtual vehicle image 100 represents, so that the vehicle display device 1 can allow the status of the host vehicle V to be more readily recognized.

The vehicle display device according to the embodiment of the present invention described above is for illustrative purposes only and it will be understood that various modifications can be made without departing from the spirit and scope of the appended claims.

The processor 53 (image processing unit 53b, the display controller 53c) described above may be configured so as not to paste the reflected image 200 onto any face that is not displayed in any display mode in the virtual vehicle 100A, which the virtual vehicle image 100 represents.

The imaging unit 3 described above may be configured so as to serve also as an existing imaging unit provided in the host vehicle V in advance.

The controller 5 described above may be configured such that the elements thereof are configured separately from each other and connected with each other so as to be capable of transmitting and receiving various electric signals to and from each other, and such that part of the functions thereof is achieved by another control device. The programs, applications, and the various types of data described above may be updated as appropriate, or stored in a server connected with the vehicle display device 1 over any network. All or part of the programs, applications, and the various types of data described above may, for example, be downloaded as necessary. Additionally, the processing functions of the controller 5 may be, in whole or in any part, achieved by, for example, a CPU and a program that is interpreted and performed by the CPU, or may be achieved by hardware including a wired logic circuit.

The vehicle display device in the embodiment can perform processing through which, through control of the display unit by the controller, the image of the circumstances surrounding the host vehicle captured by the imaging unit is pasted for display as the reflected image representing reflection in the host vehicle onto the outer panel of the virtual vehicle represented by the virtual vehicle image. Through the foregoing processing, the vehicle display device can display on the display unit, in an intuitive and easy to understand manner, the circumstances surrounding the host vehicle. Thus, the vehicle display device can achieve an effect of being capable of displaying the circumstances surrounding the host vehicle appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
a display unit disposed in a host vehicle and displaying an image;
an imaging unit that captures exterior image of circumstances surrounding the host vehicle; and
a controller configured to perform processing through which, by controlling the display unit, a virtual vehicle image representing a body of the host vehicle is displayed, and the exterior image of the circumstances surrounding the host vehicle captured by the imaging unit is pasted for display within the virtual vehicle image such that the exterior image represents reflection of the circumstances surrounding the host vehicle onto the body of the host vehicle, wherein
the virtual vehicle image includes
a first virtual surface that represents virtually a first outer surface of the body of the host vehicle, and
a second virtual surface that is different from the first virtual surface and represents virtually a second outer surface of the body of the host vehicle that is different from the first outer surface of the body of the host vehicle, and
the controller is configured to paste a first exterior image, out of the exterior image, onto the first virtual surface and paste a second exterior image, out of the exterior image, onto the second virtual surface, and the second exterior image is different from the first exterior image.

2. The vehicle display device according to claim 1, wherein
the controller controls the display unit to emphasize a specific object image representing a specific object included in one of the first exterior image and the second exterior image.

3. The vehicle display device according to claim 2, further comprising:
a host vehicle status detecting device that detects a status of the host vehicle, wherein
the controller varies the orientation of the virtual vehicle image according to the status of the host vehicle detected by the host vehicle status detecting device.

4. The vehicle display device according to claim 1, further comprising:
a host vehicle status detecting device that detects a status of the host vehicle, wherein
the controller varies the orientation of the virtual vehicle image according to the status of the host vehicle detected by the host vehicle status detecting device.

5. The vehicle display device according to claim 1, wherein
the first exterior image is an image posterior to the host vehicle and the second exterior image is an image of a right lateral side of the vehicle, the first virtual surface is a rear surface and the second virtual surface is a right side outer surface, and the controller is configured to, paste the image posterior to the host vehicle, out of the image of the circumstances surrounding the host vehicle, onto the rear surface of the virtual vehicle image, paste the image of the right lateral side of the host vehicle, out of the image of the circumstances surrounding the host vehicle, onto the right side outer surface of the virtual vehicle image, and paste an image superior to the host vehicle, out of the image of the circumstances surrounding the host vehicle, onto an upper outer surface of the virtual vehicle image.

6. A vehicle display comprising:

a display unit disposed in a host vehicle and displaying an image;

an imaging unit that captures an image of circumstances surrounding the host vehicle; and a controller configured to perform processing through which, by controlling the display unit, a virtual vehicle image representing a body of the host vehicle is displayed, and the image of the circumstances surrounding the host vehicle captured by the imaging unit is pasted for display on the virtual vehicle image such that the image represents reflection of the circumstances surrounding the host vehicle onto the body of the host vehicle, wherein the controller controls the display unit to vary an orientation of the virtual vehicle image according to content in the image of the circumstances surrounding the host vehicle captured by the imaging unit.

7. The vehicle display device according to claim 6, wherein the controller controls the display unit to emphasize a specific object image representing a specific object included in one of the first exterior image and the second exterior image.

8. The vehicle display device according to claim 7, further comprising:

a host vehicle status detecting device that detects a status of the host vehicle, wherein the controller varies the orientation of the virtual vehicle image according to the status of the host vehicle detected by the host vehicle status detecting device.

9. The vehicle display device according to claim 6, further comprising:

a host vehicle status detecting device that detects a status of the host vehicle, wherein the controller varies the orientation of the virtual vehicle image according to the status of the host vehicle detected by the host vehicle status detecting device.

10. A vehicle display device comprising:

a display unit disposed in a host vehicle and displaying an image;

a controller configured to, acquire an exterior image of circumstances surrounding the host vehicle, the exterior image being captured by an imaging unit, and perform processing through which, by controlling the display unit, a virtual vehicle image representing a body of the host vehicle is displayed, and the exterior image of the circumstances surrounding the host vehicle acquired by the controller is pasted for display within the virtual vehicle image such that the exterior image represents reflection of the circumstances surrounding the host vehicle onto the body of the host vehicle, wherein the virtual vehicle image includes a first virtual surface that represents virtually a first outer surface of the body of the host vehicle, and a second virtual surface that is different from the first virtual surface and represents virtually a second outer surface of the body of the host vehicle that is different from the first outer surface of the body of the host vehicle, and the controller is configured to paste a first exterior image, out of the exterior image, onto the first virtual surface and paste a second exterior image, out of the exterior image, onto the second virtual surface, and the second exterior image is different from the first exterior image.

* * * * *